US011519122B2

(12) United States Patent
Kern

(10) Patent No.: US 11,519,122 B2
(45) Date of Patent: Dec. 6, 2022

(54) WASHER APPLIANCE WITH REMOVABLE AGITATOR POST AND TORQUE TRANSMITTING SHAPE

(71) Applicant: Haier US Appliance Solutions, Inc., Wilmington, DE (US)

(72) Inventor: Jeffrey Alan Kern, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/202,801

(22) Filed: Mar. 16, 2021

(65) Prior Publication Data

US 2022/0298702 A1 Sep. 22, 2022

(51) Int. Cl.
| | |
|---|---|
| *D06F 37/40* | (2006.01) |
| *F16B 19/00* | (2006.01) |
| *D06F 37/24* | (2006.01) |
| *D06F 23/04* | (2006.01) |

(52) U.S. Cl.
CPC .............. *D06F 37/40* (2013.01); *D06F 23/04* (2013.01); *D06F 37/24* (2013.01); *F16B 19/00* (2013.01)

(58) Field of Classification Search
None
See application file for complete search history.

(56) References Cited

U.S. PATENT DOCUMENTS

| | | | | |
|---|---|---|---|---|
| 2,976,711 | A | * | 3/1961 | Smith ................... D06F 39/024 68/53 |
| 4,077,239 | A | * | 3/1978 | Platt ....................... D06F 13/02 68/184 |
| 5,473,916 | A | | 12/1995 | Ye |
| 10,787,761 | B2 | | 9/2020 | Czarnecki |
| 2019/0062978 | A1 | * | 2/2019 | Czarnecki ............... D06F 37/12 |

FOREIGN PATENT DOCUMENTS

| | | |
|---|---|---|
| BR | MU9002286 U2 | 3/2013 |
| CN | 2571803 Y | 9/2003 |

OTHER PUBLICATIONS

BR-102020018076-A2, Electric Household Appliances for Treating Clothes to be Washed That Has a Removable Clothing Machine, Whirlpool Mar. 2021 (Year: 2021).*

* cited by examiner

*Primary Examiner* — Cristi J Tate-Sims
(74) *Attorney, Agent, or Firm* — Dority & Manning, P.A.

(57) ABSTRACT

A washing appliance including a removable agitator post having a recess configured for complementary receipt of an impeller interface. A plurality of apertures can be spaced around a bottom end of the agitator post. A plurality of alignment pins may extend from the impeller interface and into the plurality of apertures. The alignment pins can be movable in and out of the apertures so that the agitator post can be secured to, or released from, the impeller interface.

16 Claims, 10 Drawing Sheets

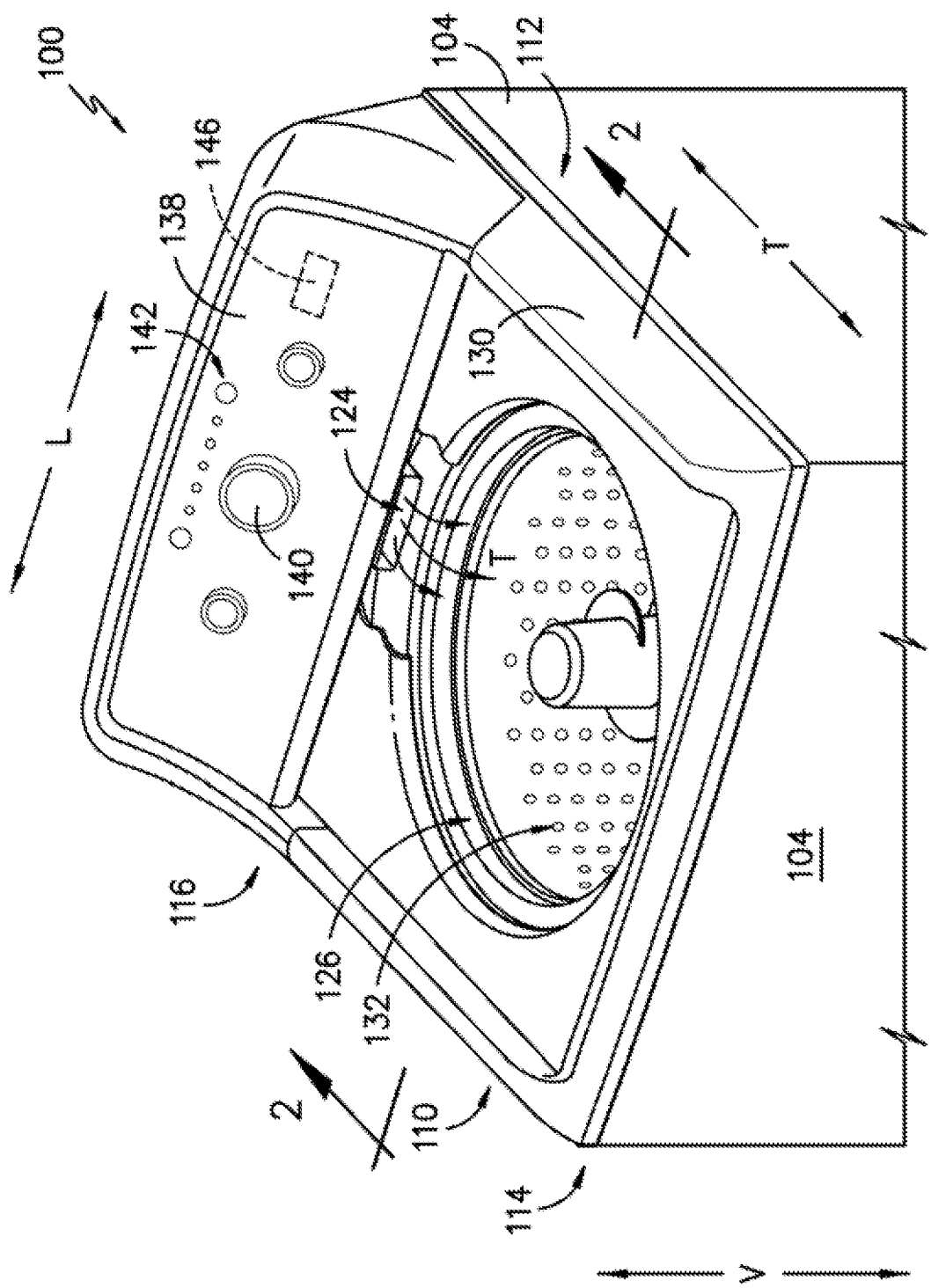

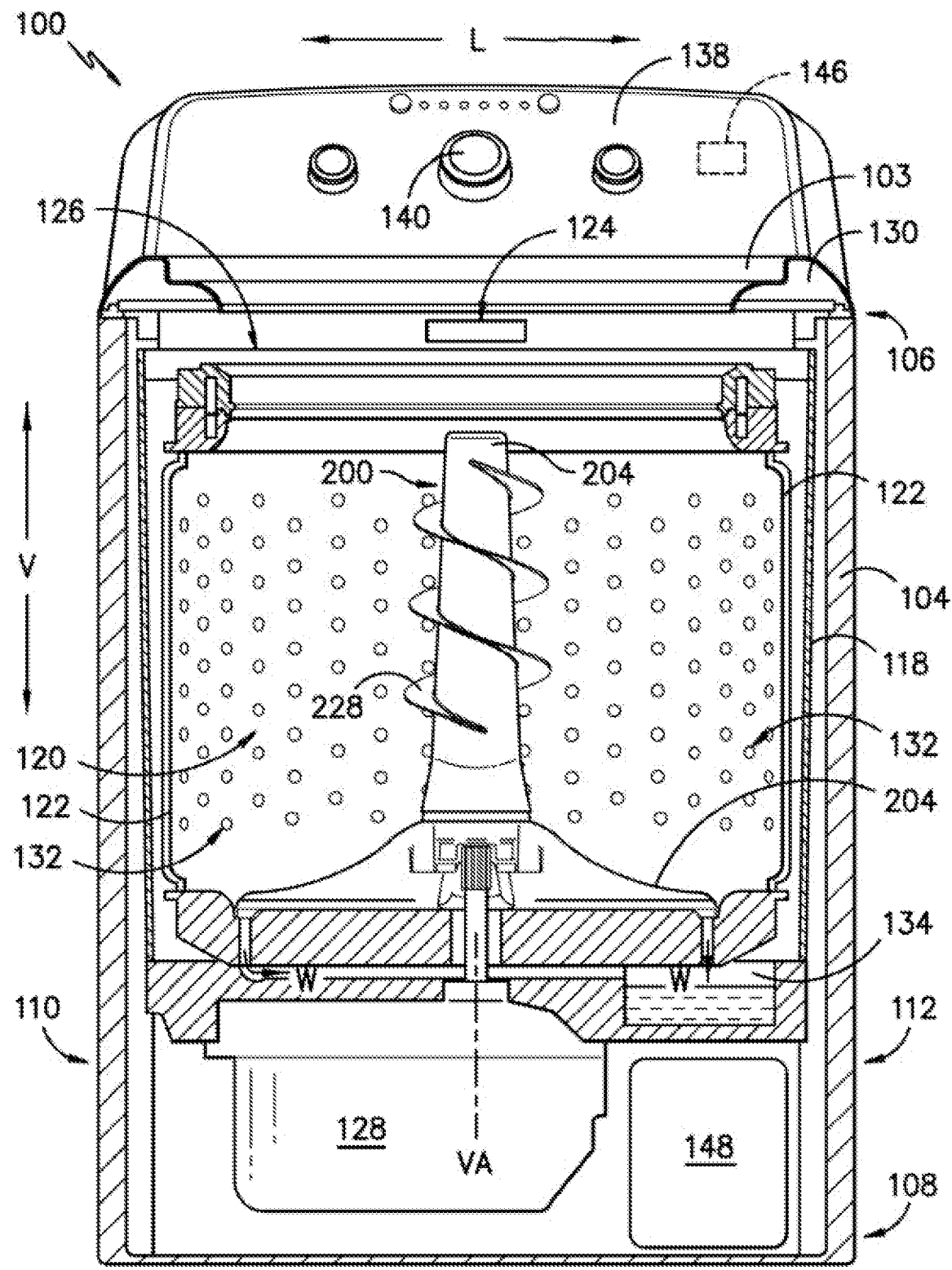
FIG. -2-

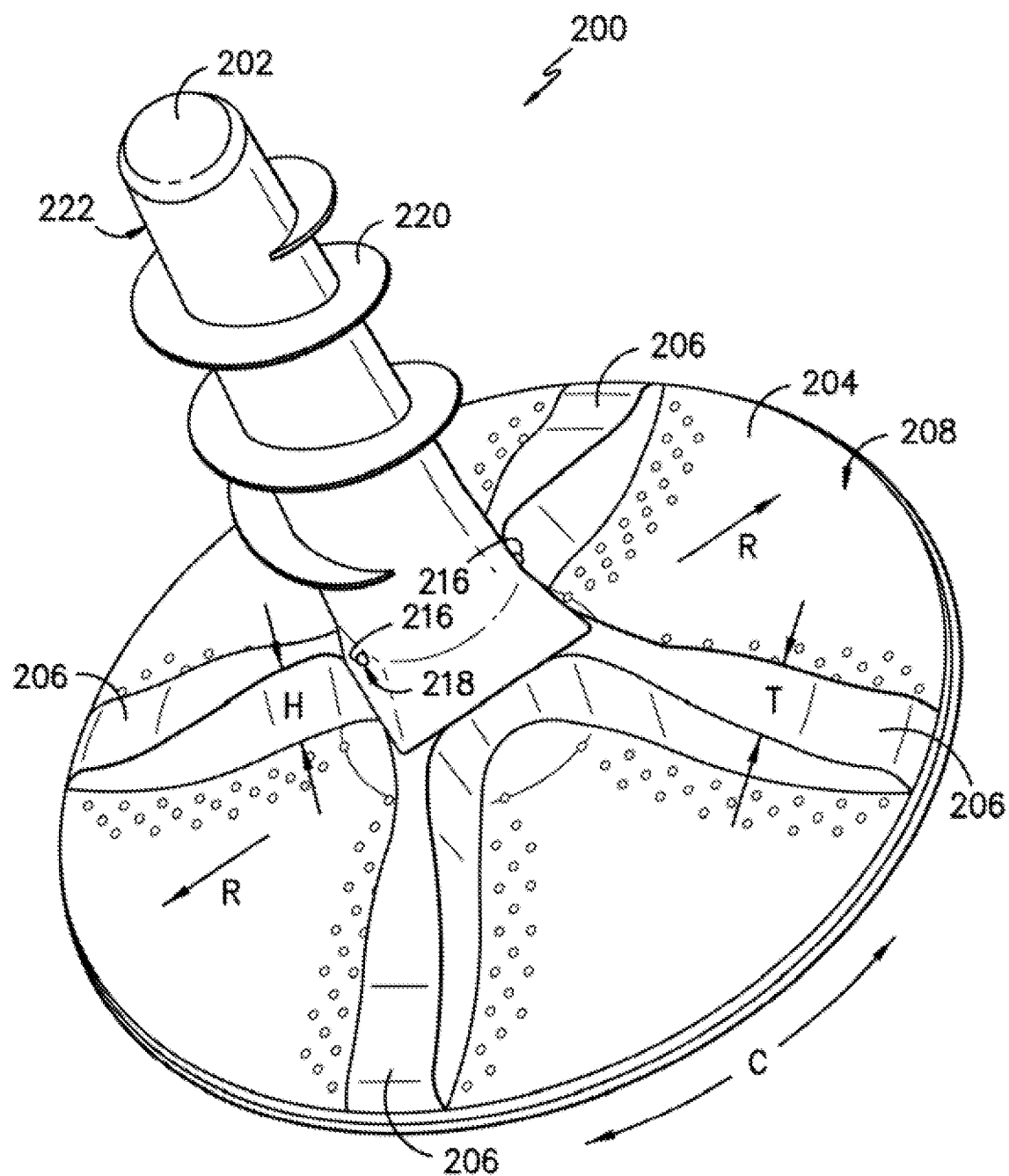
FIG. -3-

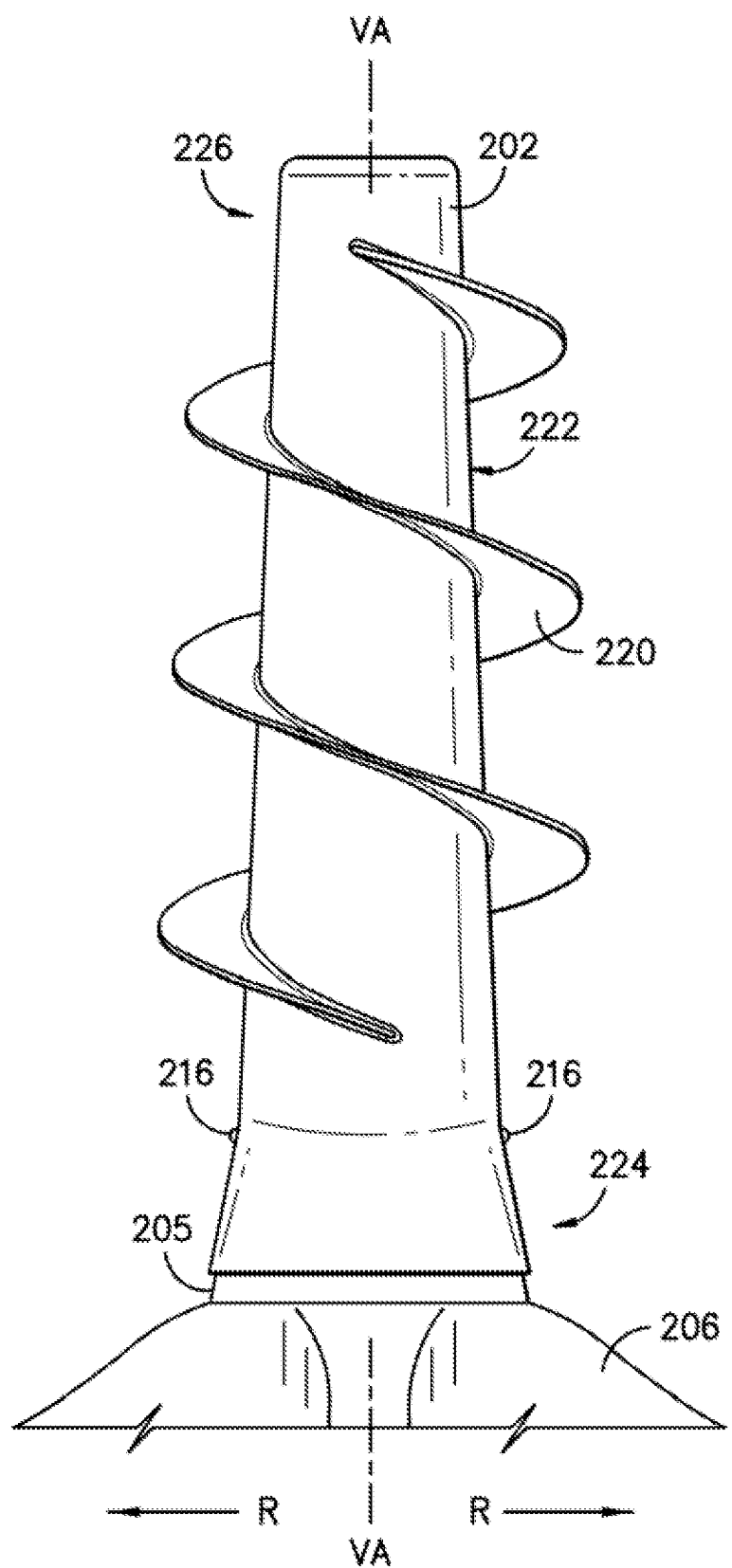
FIG. -4-

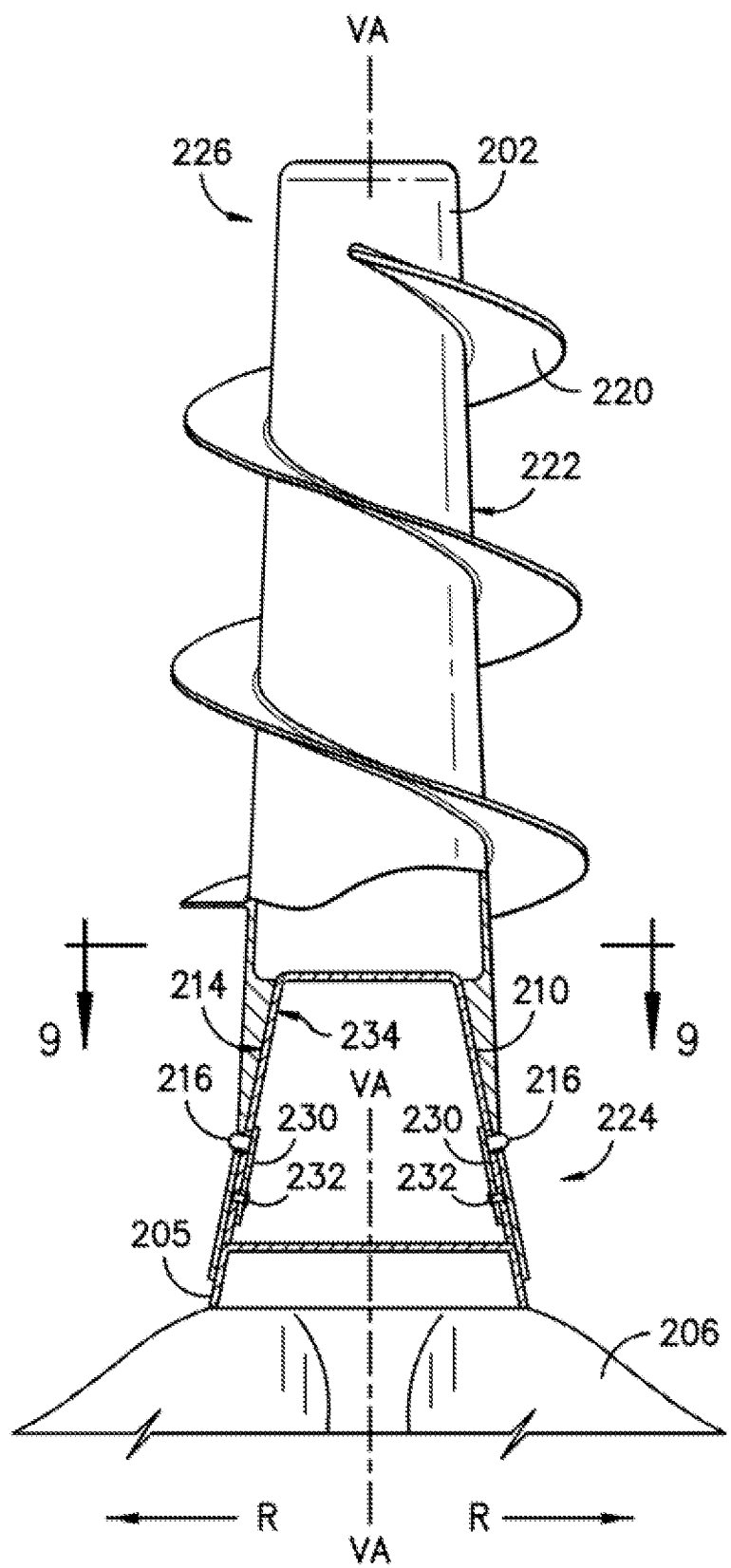
FIG. -5-

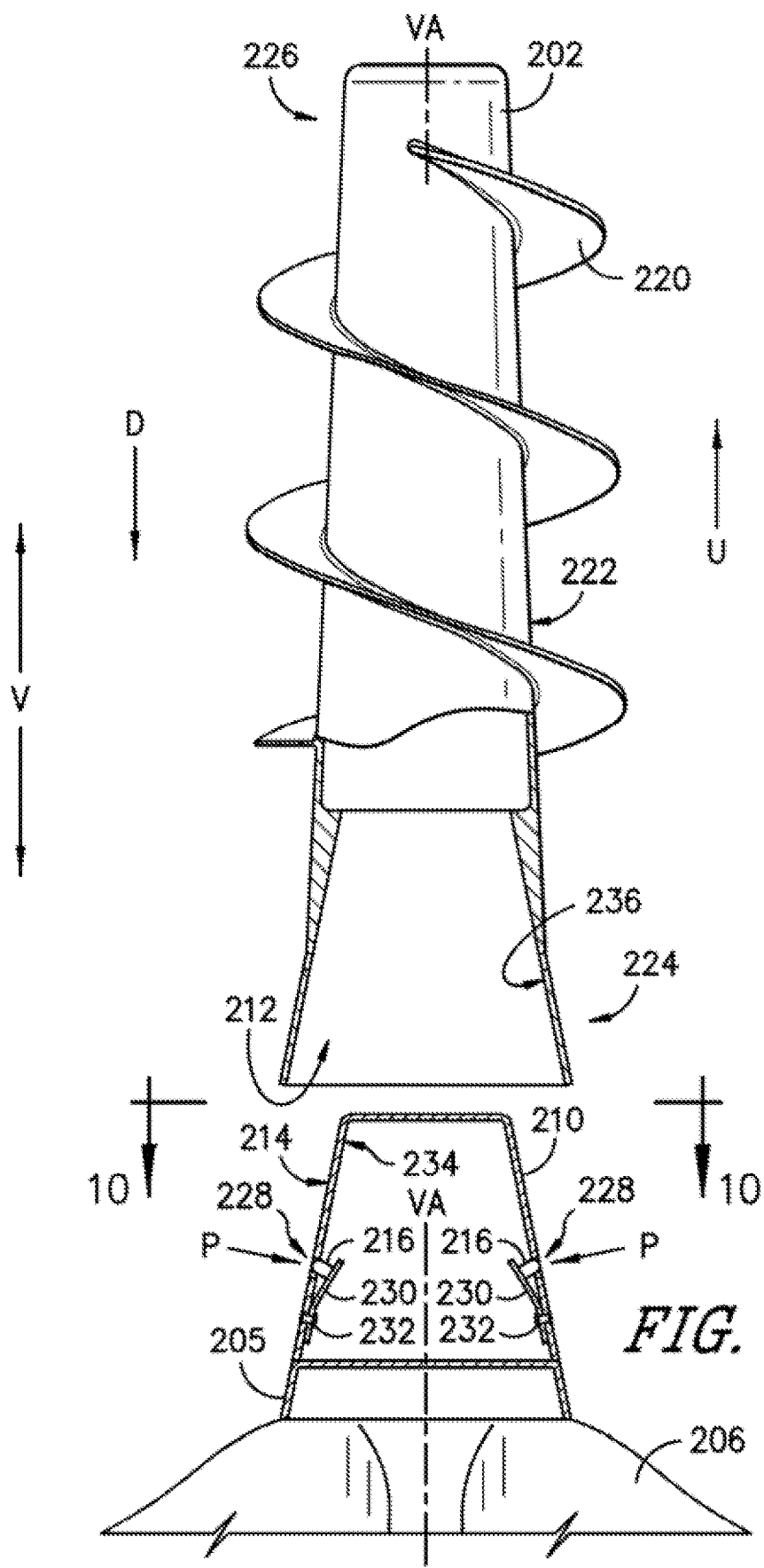
FIG. -6-

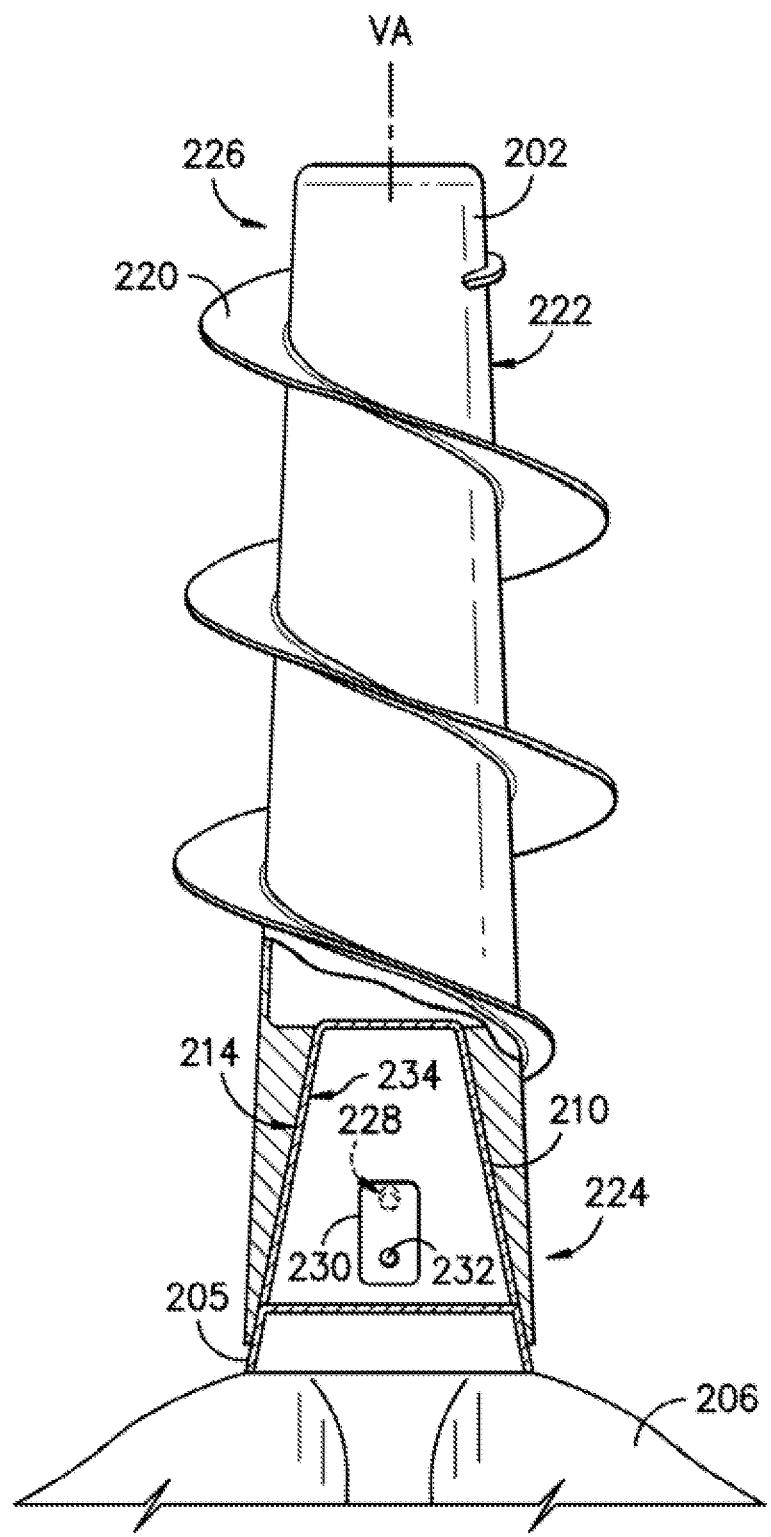
FIG. -7-

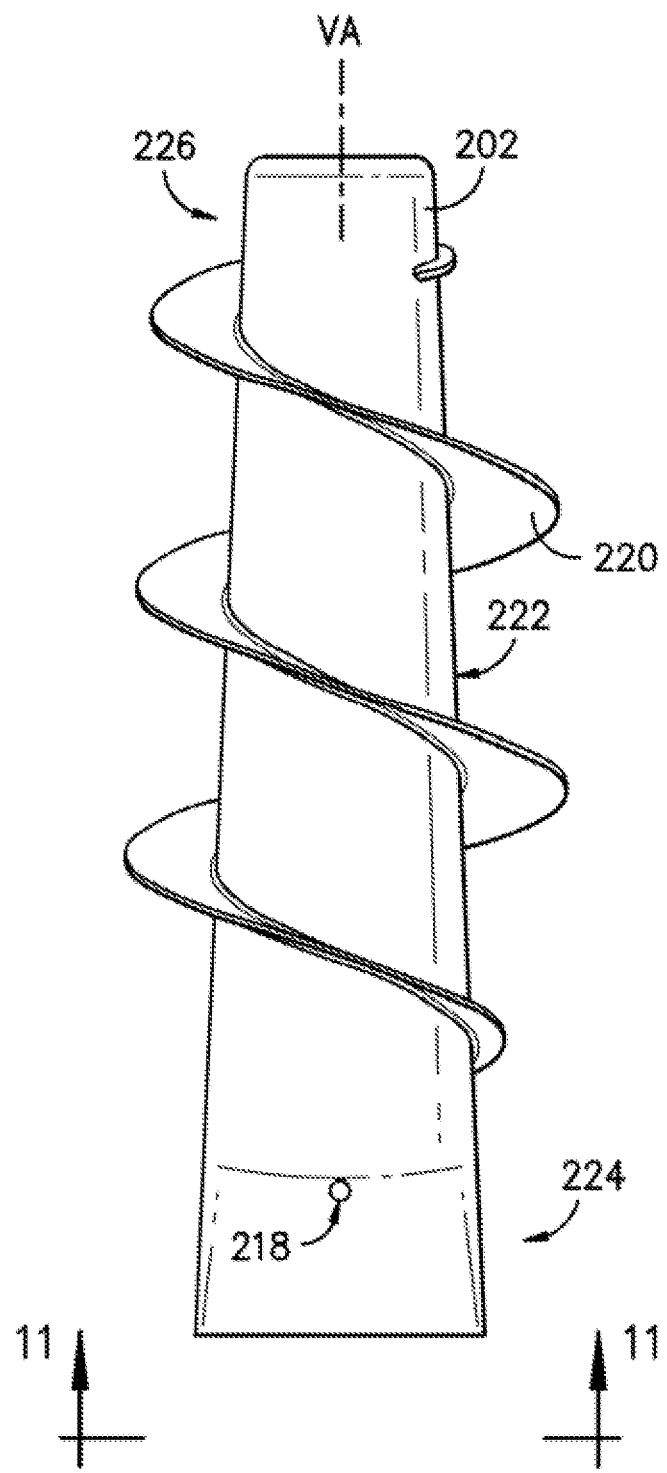
FIG. -8-

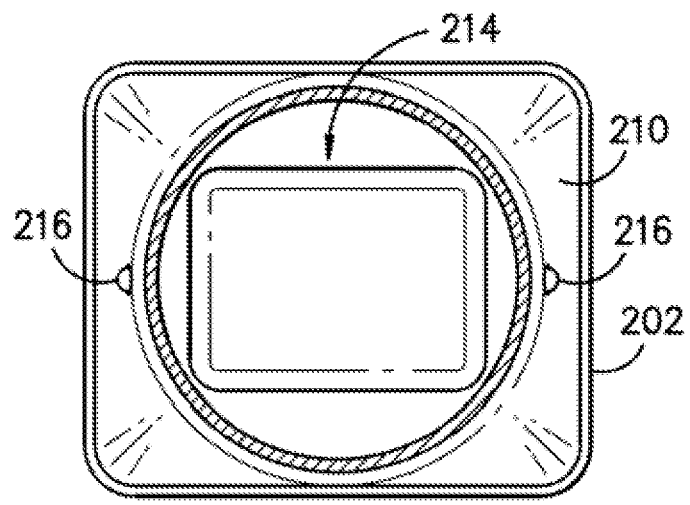
FIG. -9-
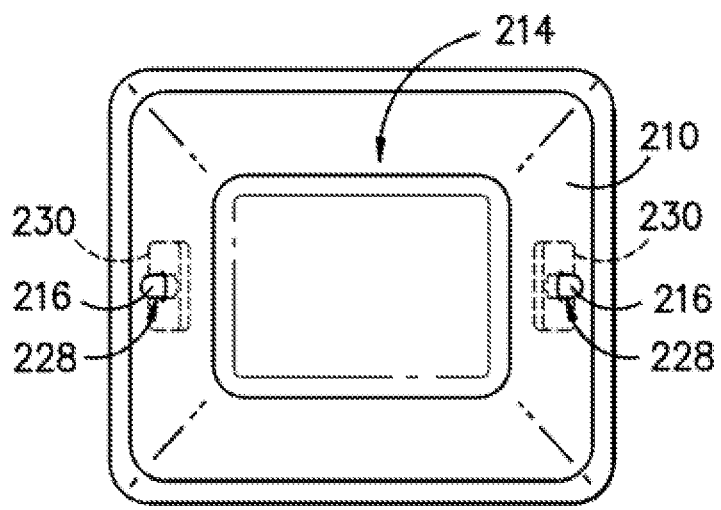
FIG. -10-

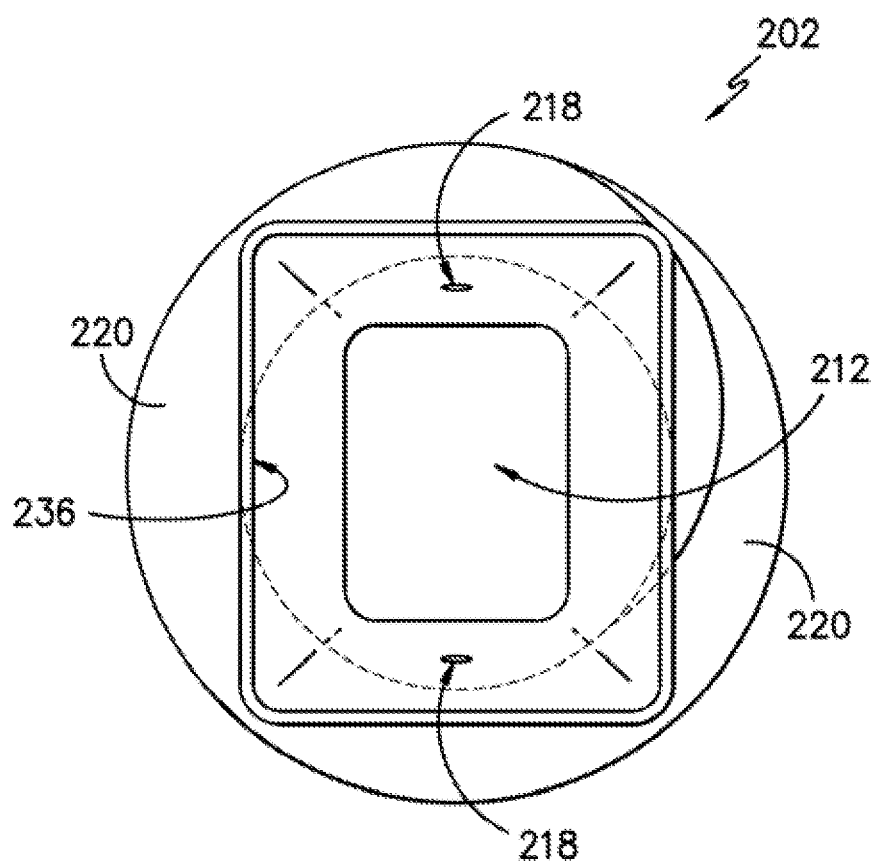
FIG. -11-

WASHER APPLIANCE WITH REMOVABLE AGITATOR POST AND TORQUE TRANSMITTING SHAPE

FIELD OF THE INVENTION

The subject matter of the present disclosure relates generally to a washer appliance having a removable agitator post.

BACKGROUND OF THE INVENTION

Washing appliances (also referred to as "washing machines") typically include a drum or basket for receipt of articles to be washed. Top-load or vertical axis washing machines rotate the drum about the vertical axis at various points during the cleaning cycle. Various components provide for adding fluid into the drum and for imparting motion to the fluid and articles being washed in order to clean the articles.

Conventionally, the washing appliance may include a knob or other switch by which the user selects the level of fluid in the vertical axis washing machine based on e.g., the load size of articles being washed. The user visually determines the desired fluid level based on the anticipated load size. Many washing appliance users are also accustomed to seeing a conventional agitator in the form of a post extending up from the bottom of the wash basket and configured to impart motion to the fluid and articles during the cleaning cycles. Users may associate factors such as fluid level and movement of the agitator as directly related to the effective cleaning of the articles and may believe that increased fluids levels and agitator action are advantageous.

Certain articles may require more wash space within the wash drum. For example, large garments, pillows, comforters and the like may require more volume for washing than typical articles of clothing. Sufficient space is required in order for the washing appliance to be able to impart motion to the articles and wash fluid as part of the cleaning process. Conventional agitator designs having a post that extends into the wash basket necessarily consume at least part of this space. In addition, in such designs the agitator is typically not designed for removal by the user of the appliance.

Improvements in technology and increasing water conservation requirements have resulted in washing appliances that can use less water during the cleaning cycle and may use features other than the conventional post-type agitator for imparting the desired movement of the articles within the wash basket or wash drum. For example, rotatable impellers have been developed that can impart the desired movement while consuming less volume inside the wash drum than the conventional agitator. Some washing appliances utilizing such designs may also be able to use less water during the cleaning cycle as well.

However, user perception of washing machine features that provide for the best cleaning experience may contradict the actual impact of such features. As previously mentioned, consumers familiar with a conventional post-type agitator extending vertically from the bottom of the wash drum may be reluctant to purchase or use a vertical-axis washing appliance lacking such feature. Yet, depending on the particular design employed, an impeller located at the bottom of the wash drum may have more impact in creating the desired agitation and cleaning of articles than the conventional agitator—including under conditions of less water usage. And for larger loads or loads with larger articles, the space consumed by the conventional post-type agitator is needed for the articles.

Accordingly, a washing appliance with a removable agitator would be useful. More particularly, a washing appliance that allows the user to readily install or remove an agitator while still providing for effective cleaning of articles would be beneficial. Such as washing appliance that can allow of the installation or removal without requiring special tools would be particularly beneficial.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a washing appliance having a cabinet and a wash tub positioned in the cabinet and defining a wash chamber. A wash drum is rotatably mounted within the wash chamber and is configured for receiving articles for washing. An impeller is positioned in the wash drum. The impeller is rotational about a vertical axis and configured for imparting motion to the articles during washing. The impeller includes a centrally-located impeller interface supported upon the impeller and projecting along the vertical axis from the impeller interface. The impeller interface includes a plurality of alignment pins biased to project outwardly from the impeller interface and movable between an outer position and an inner position. An agitator post is removably positioned upon the impeller interface. The agitator post can include a plurality of apertures positioned for removable receipt of the alignment pins so as to releasably secure the agitator post upon the impeller interface.

In another exemplary embodiment, the present invention provides a washing appliance that includes a cabinet and a wash tub positioned in the cabinet and defining a wash chamber. A wash drum is rotatably mounted within the wash chamber and configured for receiving articles for washing. An impeller is positioned in the wash drum. The impeller is rotational about a vertical axis and is configured for imparting motion to the articles during washing. An impeller interface is attached to the impeller. The impeller interface has a non-circular, exterior surface. An agitator post is supported on the impeller interface. The agitator post can define a recess configured for complementary receipt of the impeller interface. The agitator post may also define a plurality of apertures spaced around a bottom end of the agitator post. A plurality of alignment pins may extend from the impeller interface and into the plurality of apertures. The alignment pins can be movable in and out of the apertures so that the agitator post can be secured to, or released from, the impeller interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a partial perspective view of an exemplary embodiment of a washing machine of the present invention.

FIG. 2 provides a front cross-sectional view of the exemplary washing machine of FIG. 1.

FIG. 3 provides a perspective view of an exemplary embodiment of an article movement mechanism of the present invention in which an exemplary agitator post is included.

FIG. 4 provides an assembled side view of the exemplary article movement mechanism of FIG. 3.

FIG. 5 is a partial cross-sectional side view of the exemplary article movement mechanism of FIG. 3.

FIG. 6 is an exploded and partial cross-sectional side view of the exemplary article movement mechanism of FIG. 3.

FIG. 7 is an assembled and partial cross-sectional side view of the exemplary article movement mechanism of FIG. 3.

FIG. 8 is a side view of the exemplary agitator post of FIG. 3.

FIG. 9 is a cross-sectional view of the exemplary article selection mechanism taken along line 9-9 of FIG. 5.

FIG. 10 is a top view of the exemplary article selection mechanism of previous figures as viewed along the direction of lines 10-10 in FIG. 6.

FIG. 11 is a bottom view of the exemplary article selection mechanism of previous figures as viewed along the direction of lines 11-11 in FIG. 8.

The use of the same or similar reference numbers in the figures denotes same or similar features unless the context indicates otherwise.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 illustrate an exemplary embodiment of a vertical axis washing appliance 100 of the present invention, which is also sometimes referred to as a top loading or vertical axis washing machine. In FIG. 1, a door 103 (shown in FIG. 2) has been removed for purposes of illustrating other features of the invention. Washing machine appliance 100 has a cabinet 104 that extends between a top portion 106 and a bottom portion 108 along the vertical direction V, between a first side (left) 110 and a second side (right) 112 along the lateral direction L, and between a front 114 and a rear 116 along the transverse direction T. The present invention is not limited to the particular vertical axis washing appliance 100 shown in the figures. Using the teachings disclosed herein, one or skill in the art will understand the other embodiments of a washing machine are also in the scope of the present invention.

As best shown in FIG. 2, a wash tub 118 is positioned within cabinet 102, defines a wash chamber 120, and is generally configured for retaining wash fluids during an operating cycle. A wash drum 122 is rotatably mounted within wash chamber 120 of wash tub 118. Washing machine appliance 100 further includes a dispenser 124 for dispensing wash fluid into wash tub 118. In addition, appliance 100 may include one or more additional dispensers for directing fluid into wash tub 118 and each dispenser may be separately controlled by one or more valves controlling flow to each dispenser independently of the others. The term "wash fluid" refers to a liquid used for washing and/or rinsing articles during an operating cycle and may include any combination of water, detergent, fabric softener, bleach, and other wash additives or treatments. As used herein, the term "cleaning cycle" includes a wash cycle, rinse cycle, spin cycle, or combinations thereof.

Wash drum 122 and cabinet 104 generally define an opening 126 (accessible through door 103) for receipt of articles for washing. Wash drum 122 rotates about a vertical axis of rotation VA (FIGS. 2 and 3) powered by motor assembly 128. According to the illustrated embodiment, the axis of rotation VA is substantially parallel to the vertical direction V. As used herein, terms of approximation, such as "approximately," "substantially," or "about," refer to being within a ten percent margin of error.

As illustrated, cabinet 104 of washing machine appliance 100 has a top panel 130. Top panel 130 defines an opening (FIG. 1) that coincides with opening 126 of wash tub 118 to permit a user access to wash drum 122. Door 103 is rotatably mounted to top panel 130 to permit selective access to opening 126. In particular, door 103 selectively rotates between a closed position and an open position. In the closed position, door 103 inhibits access to wash drum 122. Conversely, in the open position, a user can access wash drum 122. Although door 103 is illustrated as mounted to top panel 130, door 103 may alternatively be mounted to cabinet 104 or any other suitable support.

As best shown in FIG. 2, wash drum 122 further defines a plurality of perforations 132 to facilitate fluid communication between an interior of wash drum 122 and wash tub 118. In this regard, wash drum 122 is spaced apart from wash tub 118 to define a space for wash fluid to escape wash chamber 120. During a spin cycle, wash fluid within articles being washed (e.g., clothing) and within wash chamber 120 is urged through perforations 132 wherein it may collect in a sump 134 defined by wash tub 118. Washing machine appliance 100 further includes a pump assembly 148 (FIG. 2) that is located beneath wash tub 118 and wash drum 122 for gravity assisted flow when draining wash tub 118.

An exemplary article movement mechanism 200, including impeller 204 (FIGS. 2 and 3) and agitator post 202, is rotatably mounted within wash drum 122 to impart motion to articles and liquid in wash drum 122. More specifically, impeller 204 and agitator post 202 extend into wash drum 122 and assist agitation of articles disposed within wash drum 122 (as will be later described) during operation of washing appliance 100, e.g., to facilitate improved cleaning. For this exemplary embodiment, agitator post 202 includes a helical vane 220 extending from the exterior surface 222 of post 202 between bottom end 224 and top end 226 thereof. Helical vane 220 may be configured to assist the agitation of articles or support the overall desired motion thereof during a cleaning cycle. As will be understood by one of skill in the art using teachings disclosed herein, helical vane 220 may have different shapes, thickness, and other features from what is depicted in the figures and may actually include multiples sets of overlapping or non-overlapping vanes.

In different embodiments, impeller 204 and agitator post 202 may rotate separately or together. Such rotations include a single action element (i.e., oscillatory only), a double action element (oscillatory movement at one end, single direction rotation at the other end) or a triple action element (oscillatory movement plus single direction rotation at one end, single direction rotation at the other end). Impeller 204, agitator post 202, and wash drum 122 are oriented to rotate about a vertical axis of rotation VA (which is substantially parallel to vertical direction V). For example, impeller 204 and/or agitator post 202 may rotate back and forth in alternate directions about vertical axis VA during a cleaning cycle. Additional description of the actions of impeller 204 and agitator post 202 are set forth below.

As stated, washing machine appliance 100 includes a motor assembly 128 in mechanical communication with wash drum 122 to selectively rotate wash drum 122 (e.g., during a wash cycle or a rinse cycle of washing machine appliance 100). In addition, motor assembly 128 may also be in mechanical communication with impeller 204 and agitator post 202. In this manner, motor assembly 128 may be configured for selectively and independently rotating or oscillating wash drum 122, impeller 204, and/or agitator post 202 during various operating cycles of washing machine appliance 100.

Referring still to FIGS. 1 through 3, a control panel 138 with at least one input selector 140 (FIGS. 1 and 2) extends from top panel 130. Control panel 138 and input selector 140 collectively form a user interface input for operator selection of machine cycles and features of washing appliance 100. A display 142 of control panel 138 indicates selected features, operation mode, a countdown timer, and/or other items of interest to appliance users regarding operation.

Operation of washing machine appliance 100 is controlled by at least one controller or processing device 146 that is operatively coupled to control panel 138 for user manipulation to select washing machine cycles and features. In response to user manipulation of control panel 138, controller 146 operates the various components of washing machine appliance 100 to execute selected machine cycles and features. According to an exemplary embodiment, controller 146 may include a memory and microprocessor, such as a general or special purpose microprocessor operable to execute programming instructions or micro-control code associated with methods described herein. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 138 and other components of washing machine appliance 100 may be in communication with controller 146 via one or more signal lines or shared communication busses.

During operation of washing machine appliance 100, laundry items are loaded into wash drum 122 through opening 126, and washing operation is initiated through operator manipulation of input selector 140. Water, detergent and/or other fluid additives can be added to wash tub 118 and wash drum 122 through dispenser 124 and/or other dispensers as well. Controller 146 can operate one or more valves of washing appliance 100 to provide for filling wash tub 118 and wash drum 122 to the appropriate level for the amount of articles being washed and/or rinsed. By way of example for a wash mode, once wash drum 122 is properly filled with fluid, the contents of wash drum 122 can be agitated (e.g., with article movement mechanism 200 as discussed previously) for washing of laundry items in wash drum 122. The specific operation of wash appliance 100 by controller 146 will depend on various inputs including the cycle and other settings that may be selected by the user, the amount of article placed in wash chamber 120, and other variables as will be understood by one of skill in the art using the teachings disclosed herein.

By way of continuing example, after wash tub 118 is filled and the agitation phase of the wash cycle is completed, wash tub 118 and drum 122 can be drained, e.g., by drain pump assembly 148. Laundry articles can then be rinsed by again adding fluid to wash drum 122 and tub 118 again depending on the specifics of the cleaning cycle selected by a user. The impeller 204 and/or agitator post 202 may also provide agitation within wash drum 122. One or more spin cycles may also be used as part of the cleaning process. In particular, a spin cycle may be applied after the wash cycle and/or after the rinse cycle in order to wring wash fluid from the articles being washed. During a spin cycle, wash drum 122 is rotated at relatively high speeds to help wring fluid from the laundry articles through perforations 132. After articles disposed in wash drum 122 are cleaned and/or washed, the user can remove the articles from wash drum 122, e.g., by reaching into wash drum 122 through opening 126.

As will now be further described, the exemplary article movement mechanism 200 allows desired movements to be imparted to articles in wash drum 122 during a cleaning cycle. These movements, which can include combinations of movement along vertical direction V and radial direction R, assist in cleaning articles while in the wash fluid. One exemplary pattern of movement will now be described. Using the teachings disclosed herein, one of skill in the art will understand that other patterns or paths of fluid and/or article movement in drum 122 may be used as well in other embodiments of the invention.

For example, after articles to be cleaned and fluid are loaded into cylindrical wash drum 122, rotations of impeller 204 may impart an inverse toroidal motion to articles in wash drum 122 during a cleaning cycle. In such motion, articles may move vertically upward from impeller 204 along agitator post 202 and then radially outward (the radial direction is indicated by arrow R in FIG. 3, which is a direction perpendicular to vertical axis VA) at the top of an article load towards the cylindrical portion 123 of wash drum 122.

The articles then move vertically downward towards impeller 204 and radially inward along the bottom of an article load towards agitator post 202 where the cycle repeats under the influence of components such as impeller 204. Accordingly, during a cleaning cycle, this inverse toroidal motion results generally in a turnover of articles in wash drum 122. As used herein, "inverse toroidal motion" or "inverse toroidal movement" does not refer to the specific movement necessarily of any individual article but to the overall movement of articles in wash drum 122 instead. A variety of factors create the inverse toroidal motion the occurs in wash drum 122 including, for example, the relative amounts of fluid and articles present in drum 122, the shape of wash drum 122, the configuration and movements of agitator post 202, the configuration and movements of impeller 204, and other factors as well.

With reference to FIG. 3, for this exemplary embodiment, impeller 204 includes a plurality of radial lobes 206 spaced apart along circumferential direction C. Each lobe 206 has thickness T as measured along the circumferential direction C that varies moving along radial direction R. For the exemplary embodiment shown, thickness T narrows and then widens moving along radial direction R and away from agitator post 202. Each lobe 206 also has a height H above impeller base 208 along axial direction A that also varies along radial direction R. For the exemplary embodiment shown, height H gradually decreases moving along radial direction R and away from agitator post 202. Impeller 204 as depicted in FIGS. 2 and 3 is provided by way of example only. Other shapes and configurations may be used as well.

As noted, the configuration of impeller 204 assists in creating the desired movement of fluid and/or articles within wash drum 122. Article movement mechanism 200 also includes an agitator post 202 which may assist in providing or supporting the desired movement. In addition, using features as will also be described, agitator post 202 can be readily installed or removed by a user of appliance 100 without the use of special tools. Removal of agitator post 202 allows more volume within wash drum 122 for the receipt of articles and/or fluid. At the same time, agitator post 202 can be readily installed as may be needed for a particular movement of articles in drum 122 or as may be based on e.g., user preference. An exemplary embodiment of agitator post 202 is set forth in the figures and will now be further described.

Referring to FIGS. 3 through 11, for this exemplary embodiment, mechanism 200 includes an impeller interface 210 supported on impeller 204. Impeller interface 210 is centrally-located and rotates with impeller 204 about vertical axis VA. For this exemplary embodiment, impeller interface 210 is a plastic component that has been molded separately and then sonically-welded to a connection post 205 of impeller 204. In other embodiments, impeller 204 may be integrally molded to, or with, impeller 204 or may be releasably attached to impeller 204. Other methods and materials of construction and attachment may also be used.

Agitator post 202 is removably positioned on impeller interface 210. More specifically, agitator post 202 defines a recess 212 (FIGS. 6 and 11) configured for complementary receipt of impeller interface 210 so that agitator post 202 may be supported thereon. Recess 212 is shaped to match the shape of exterior surface 214 of impeller interface 210. For this embodiment, recess 212 and exterior surface 214 are rectangular-shaped. This shape assists in transferring torque between impeller 204 and agitator post 202 during a cleaning cycle wherein impeller 204 is rotated back and forth as previously described. This shape also assists in ensuring the agitator post 202 is properly oriented for the operation of certain connection features (e.g., pins and apertures) as will be further described. As indicated by arrows U and D in FIG. 6, agitator post 202 can be removed from impeller interface 210 by movement along vertical axis VA and the manipulation of such connection features.

Impeller interface 210 includes a plurality of alignment pins 216 that are removably received in a plurality of apertures 218 (FIG. 8) provided by agitator post 202. Apertures 218 are spaced apart around bottom end 224 of agitator post 202. For this embodiment, two apertures 218 are spaced 180 degrees apart. Similarly, two alignment pins 216 are also spaced 180 degrees apart so as to be aligned with apertures 218 when agitator post 202 is received onto impeller interface 210. The shape of recess 212 and impeller interface 210 ensures that the user properly orients agitator post 202 as previously described so that the location of pins 216 and apertures 218 coincide. In other embodiments of the invention, a different number of pins 216 and apertures 218 with different alignments and spacings may also be used.

Alignment pins 216 are biased to project outwardly from impeller interface 210 but are movable between an inner position shown in FIG. 6 and an outer position shown in FIGS. 3, 4, 5, and 10. "Inner position" and "outer position" can be with reference to vertical axis VA in which "inner" describes a position where a pin 216 is moved towards vertical axis VA and "outer" describes a position where pin 216 is moved away from vertical axis VA. For this exemplary embodiment, such movement is generally along radial direction R, which is orthogonal to vertical axis VA. "Inner position" and "outer position" can also describe whether a pin 216 is not located within an aperture 218 or is located within an aperture 218, respectively, if agitator post 202 is in place on impeller interface 210.

When in the inner position (shown in FIG. 6), agitator post 202 can be removed or released from impeller interface 210 by pulling upwardly along the direction of arrow U. When in the outer position (FIGS. 3 and 5), the position of pins 216 within apertures 218 precludes upward movement of agitator post 202 along the direction of arrow U. Pins 216 are biased into the outer position by spring members 230 that urge pins 216 radially outward (along radial direction R away from vertical axis VA) through apertures 228 defined by impeller interface 210. Apertures 228 are positioned to align with apertures 218. For this exemplary embodiment, each spring member 230 is attached to an alignment pin 216. A rivet 232 attaches each spring member 230 to the inside surface 234 of impeller interface 210. For this exemplary embodiment, spring member 230 may be a resilient metal or plastic. Other configurations and materials may be used for providing spring member 230 as well. For example, a spring loaded piston could be used.

Springs members 230 allow for pins 216 to be depressible and move back and forth through apertures 228 and in and out of apertures 218 when agitator post 202 is in place. For example, the user may remove agitator post 202 from impeller interface 210 by simply depressing pins 216 inwardly (arrows P in FIG. 6) towards vertical axis VA lifting along the direction of arrow U. Pins 216 will move back into place after post 202 is removed.

Conversely, replacement of agitator post 202 is accomplished by simply sliding agitator post 202 down (arrow D in FIG. 6) along vertical axis VA, over impeller interface 210 with recess 212 properly oriented based on its complementary shape. Eventually, the interior surface 236 of agitator post 202 that defines recess 212 will contact pins 216. As agitator post 202 is moved downwardly along the direction of arrow D, pins 216 will move radially inward as they slide along interior surface 236. This sliding movement will continue until pins 216 align with apertures 218 and are able to move radially outward to lock or secure agitator post 202 into position on impeller interface 210.

Accordingly, the exemplary article movement mechanism 200 described and shown allows a user to remove or install agitator post 202 based on e.g., user preference, to provide additional room within wash drum 122, or as may be desired for a particular cleaning cycle. Also, once agitator post 202 is removed, the user is not necessary required to install a cover or cap because the impeller interface 210 is appropriate for washing operations—e.g., pins 216 will not snag or otherwise harm articles during the cleaning cycle.

It should be understood that agitator posts or impellers of different shapes and configurations, including one or more different vanes or lobes, may also be utilized, and the present invention is not limited to the particular agitator post 202 or impeller 204 shown in the figures. Washing appliances having difference shapes and configurations from that show for appliance 100 may also be used in still other embodiments of the invention.

Accordingly, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing appliance, comprising:
   a cabinet;
   a wash tub positioned in the cabinet and defining a wash chamber;
   a wash drum rotatably mounted within the wash chamber and configured for receiving articles for washing;
   an impeller positioned in the wash drum, the impeller being rotational about a vertical axis and configured for imparting motion to the articles during washing, the impeller including a centrally-located impeller interface supported upon the impeller and projecting along the vertical axis from the impeller interface, the impeller interface comprising a plurality of alignment pins biased to project radially outwardly from the impeller interface and movable between a radially outer position and a radially inner position; and
   an agitator post removably positioned upon the impeller interface, the agitator post comprising a plurality of apertures positioned for removable receipt of the alignment pins so as to releasably secure the agitator post upon the impeller interface, the plurality of apertures positioned on a radial face of the impeller interface.

2. The washing appliance of claim 1, further comprising a plurality of spring members, each spring member attached to one of the alignment pins and configured to move the alignment pin towards the radially outer position.

3. The washing appliance of claim 1, wherein the agitator post defines a recess for complementary receipt of the impeller interface.

4. The washing appliance of claim 1, wherein the impeller interface includes a rectangular-shaped exterior surface and the agitator post defines rectangular-shaped recess configured for complementary receipt of the impeller interface.

5. The washing appliance of claim 1, wherein the impeller defines a connection post projecting along the vertical axis and configured for receipt of the impeller interface.

6. The washing appliance of claim 1, wherein the impeller interface is welded to a connection post defined by the impeller.

7. The washing appliance of claim 1, wherein the agitator post further comprises a helical vane extending around an outer surface of the agitator post.

8. The washing appliance of claim 1, wherein the impeller comprises a plurality of lobes spaced-apart along a circumferential direction of the impeller.

9. The washing appliance of claim 8, wherein the impeller is configured for imparting an inverse toroidal motion to the articles during a cleaning cycle.

10. A washing appliance, comprising:
    a cabinet;
    a wash tub positioned in the cabinet and defining a wash chamber;
    a wash drum rotatably mounted within the wash chamber and configured for receiving articles for washing;
    an impeller positioned in the wash drum, the impeller being rotational about a vertical axis and configured for imparting motion to the articles during washing;
    an impeller interface attached to the impeller, the impeller interface having a non-circular, exterior surface;
    an agitator post supported on the impeller interface, the agitator post defining a recess configured for complementary receipt of the impeller interface, the agitator post defining a plurality of apertures spaced around a bottom end of the agitator post;
    a plurality of alignment pins extending from the impeller interface and biased into the plurality of apertures when the agitator post is positioned on the impeller interface, the alignment pins movable in and out of the apertures whereby the agitator post can be secured to, or released from, the impeller interface, and
    a plurality of spring members, each spring member attached to one of the alignment pins and configured to push one of the alignment pins along a radial direction into one of the apertures.

11. The washing appliance of claim 10, wherein the impeller interface includes a rectangular-shaped exterior surface and the agitator post defines rectangular-shaped recess configured for complementary receipt of the impeller interface.

12. The washing appliance of claim 10, wherein the impeller defines a connection post projecting along the vertical axis and configured for receipt of the impeller interface.

13. The washing appliance of claim 12, wherein the impeller interface is welded to a connection post defined by the impeller.

14. The washing appliance of claim 10, wherein the agitator post further comprises a helical vane extending around an outer surface of the agitator post.

15. The washing appliance of claim 10, wherein the impeller comprises a plurality of lobes spaced-apart along a circumferential direction of the impeller.

16. The washing appliance of claim 10, wherein the impeller is configured for imparting an inverse toroidal motion to the articles during a cleaning cycle.

* * * * *